(12) United States Patent
Ota

(10) Patent No.: US 12,534,750 B2
(45) Date of Patent: Jan. 27, 2026

(54) METHOD FOR MONITORING DYNAMIC CHANGES IN CELLS OR SUBSTANCE DERIVED THEREFROM, AND METHOD FOR CLASSIFYING CELL USING SAME

(71) Applicant: The University of Tokyo, Tokyo (JP)

(72) Inventor: Sadao Ota, Tokyo (JP)

(73) Assignee: The University of Tokyo, Tokyo (JP)

( * ) Notice: Subject to any disclaimer, the term of this patent is extended or adjusted under 35 U.S.C. 154(b) by 1456 days.

(21) Appl. No.: 16/610,227

(22) PCT Filed: May 2, 2018

(86) PCT No.: PCT/JP2018/017565
§ 371 (c)(1),
(2) Date: Apr. 23, 2021

(87) PCT Pub. No.: WO2018/203575
PCT Pub. Date: Nov. 8, 2018

(65) Prior Publication Data
US 2021/0269844 A1    Sep. 2, 2021

(30) Foreign Application Priority Data

May 2, 2017    (JP) ................................ 2017-091964

(51) Int. Cl.
*G01N 15/1433*    (2024.01)
*C12Q 1/02*    (2006.01)

(52) U.S. Cl.
CPC ......... *C12Q 1/025* (2013.01); *G01N 15/1433* (2024.01)

(58) Field of Classification Search
CPC ....... B01L 3/502784; B01L 2200/0673; C12Q 1/025; G01N 15/147; G01N 15/1433
See application file for complete search history.

(56) References Cited

U.S. PATENT DOCUMENTS

2002/0081751 A1    6/2002  Nakao et al.
2008/0268469 A1*  10/2008  Srienc ................ G01N 15/1433
                                                    435/287.1
(Continued)

FOREIGN PATENT DOCUMENTS

JP    2002-186480 A    7/2002
JP    2007-020553 A    2/2007
(Continued)

OTHER PUBLICATIONS

International Search Report dated Jul. 31, 2018, in PCT/JP2018/017565.
(Continued)

*Primary Examiner* — Jonathan M Hurst
(74) *Attorney, Agent, or Firm* — Foley & Lardner LLP

(57) ABSTRACT

The present invention provides a method for simple and effective monitoring of a dynamic change in a cell or a derivative thereof. More specifically, the present invention provides a method for monitoring a dynamic change in a cell, which includes preparing a plurality of compartments containing at least one cell or a derivative thereof and at least one bead, and repeatedly obtaining over time both state measurement information of the cell or the derivative thereof in each compartment, and imaging information of the bead to monitor a dynamic change in each cell or derivative thereof in the plurality of compartments, wherein the imaging information of the bead in each compartment can be clearly distinguished from each other and becomes an index of identifying the cell or the derivative thereof contained in each compartment.

10 Claims, 11 Drawing Sheets

(56) References Cited

U.S. PATENT DOCUMENTS

| | | | |
|---|---|---|---|
| 2009/0042737 A1 | 2/2009 | Katz et al. | |
| 2009/0068170 A1* | 3/2009 | Weitz | G01N 33/6854 424/130.1 |
| 2014/0378345 A1* | 12/2014 | Hindson | C12Q 1/6806 506/26 |
| 2015/0253237 A1* | 9/2015 | Castellarnau | G01N 35/00732 506/37 |

FOREIGN PATENT DOCUMENTS

| | | |
|---|---|---|
| JP | 2010-535511 A | 11/2010 |
| JP | 2013-508156 A | 3/2013 |
| JP | 2016-123366 A | 7/2016 |
| WO | WO-2007/133710 | 11/2007 |
| WO | WO-2009/021215 | 2/2009 |
| WO | WO-2011/056546 | 5/2011 |
| WO | WO-2014/200767 | 12/2014 |
| WO | WO-2015/031691 A1 | 3/2015 |
| WO | WO-2017/053905 A1 | 3/2017 |

OTHER PUBLICATIONS

Girault et al., "Target imaging droplet sorting system: a shape identification method for recognition and sort target droplet with cell in real time," Seibutsu Butsuri, 2015, 55(Suppl-2), S257, 1Pos204.

Macosko et al., "Highly Parallel Genome-wide Expression Profiling of Individual Cells Using Nanoliter Droplets," Cell, May 21, 2015, 161:1202-1214.

Office Action on Japanese Application No. 2019-515751 related to U.S. Appl. No. 16/610,227 dated Oct. 30, 2020 (5 pages).

Garstecki et al., "Formation of monodisperse bubbles in a microfluidic flow-focusing device," Appl. Phys. Lett., Sep. 28, 2004, 85(13)2649-2651.

Kanayama, Naoki, "Flow Cytometry", Basic Lecture on Bioengineering, Seibutsu-kogaku, 2012, 90(12):785-789, with English translation.

Nie et al., "Emulsification in a microfluidic flow-focusing device: effect of the viscosities of the liquids," Microfluid Nanofluid, 2008, 5:585-594.

He et al., "Nanowire sensors for multiplexed detection of biomolecules," Current Opinion in Chemical Biology, 2008, 12:522-528.

Supplemental European Search Report dated Jan. 25, 2021 in EP 18794063.0.

Girault et al., "An on-chip imaging droplet-sorting system: a real-time shape recognition method to screen target cells in droplets with single cell resolution," Scientific Reports, Jan. 6, 2017, 7(1):40072, 1-10.

* cited by examiner

[FIG. 2]

n types of beads

| Size | R | G | B | Feature A | Feature B | ... |
|---|---|---|---|---|---|---|
| 2 | 3 | 3 | 3 | 3 | 3 | ... |
| 2 | 3 | 3 | 2 | 3 | 3 | ... |
| 2 | 3 | 2 | 3 | 3 | 3 | ... |
| 2 | 2 | 3 | 3 | 3 | 3 | ... |
| ... | ... | ... | ... | ... | ... | ... |
| 8 | 0 | 1 | 0 | 0 | 0 | ... |
| 8 | 0 | 0 | 1 | 0 | 0 | ... |

Optical bead ID

| One-time point state measurement information of cell or derivative at optional time point of t = $t_x$ | State measurement information of cell or derivative at time point of t = $t_0$ | State measurement information of cell or derivative at time point of t = $t_1$ | Dynamics measurement information of cell or derivative at time point from $t_0$ to $t_1$ |
|---|---|---|---|
| [$Z_1, Z_2...Z_n$] for cell_1, t=$t_x$ | [$X_1, X_2...X_n$] for cell_1, t=$t_0$ | [$X_1, X_2...X_n$] for cell_1, t=$t_1$ | $\Delta_1$[$X_1, X_2...X_n$] for cell_1 from $t_0$ to $t_1$ |
| [$Z_1, Z_2...Z_n$] for cell_2, t=$t_x$ | [$X_1, X_2...X_n$] for cell_2, t=$t_0$ | [$X_1, X_2...X_n$] for cell_2, t=$t_1$ | $\Delta_2$[$X_1, X_2...X_n$] for cell_2 from $t_0$ to $t_1$ |
| ... | ... | ... | ... |
| [$Z_1, Z_2...Z_n$] for cell_n, t=$t_x$ | [$X_1, X_2...X_n$] for cell_n, t=$t_0$ | [$X_1, X_2...X_n$] for cell_n, t=$t_1$ | $\Delta_n$[$X_1, X_2...X_n$] for cell_n from $t_0$ to $t_1$ |

- $X_0$: Measurement amount, image, form feature amount, molecular information, etc., for cell or derivative
- $Z_0$: Measurement amount, image, form feature amount, molecular information, etc., for cell or derivative wherein both $Z_0 = X_0$ or $Z_0 \ne X_0$ are possible (a method in sequential measurement may be different from a method in one-time point measurement)
- From a combination of bead, cell at another time point cell_n is identified
- $t_x$ represents optional time point, $t_0$ represents starting point of sequential measurement, and $t_1$ represents end of measurement (not limited to two-time point measurement).

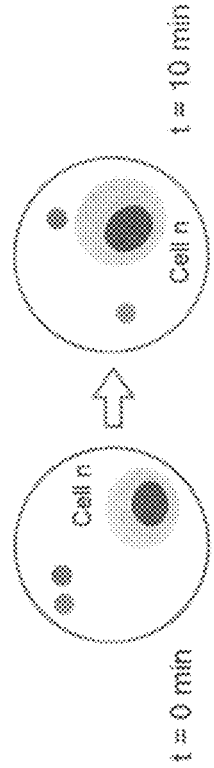

Fig. 7C

| State measurement information of cell or derivative at optional time point of t = $t_x$ | Evaluation label for temporal change in cell or derivative and cell feature |
|---|---|
| [$Z_1, Z_2...Z_d$] for cell_1, t=$t_x$ | [$Y_1, Y_2...Y_m$] for cell_1 |
| [$Z_1, Z_2...Z_d$] for cell_2, t=$t_x$ | [$Y_1, Y_2...Y_m$] for cell_2 |
| ... | ... |
| [$Z_1, Z_2...Z_d$] for cell_n, t=$t_x$ | [$Y_1, Y_2...Y_m$] for cell_n |

1. Based on evaluation of dynamic change in cell or derivative, evaluation labeling [$Y_1$-$Y_m$] is performed for state measurement information [$Z_1$-$Z_m$] of cell at optional time point of t = $t_x$.

2. The above label is imparted to cell measurement data at optional time point of t = $t_x$, and this is used as teaching data, thus producing classification model (supervised machine learning).

3. Using learned model, evaluation label prediction is performed for state measurement information of test cell (e.g., drug response is predicted from cell form in drug screening, and differentiation potential is predicted from cell form in stem cell medicine).

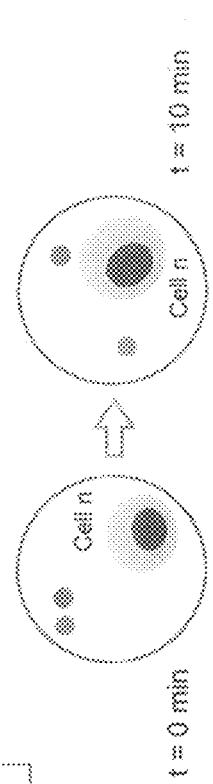

t = 0 min    t = 10 min

[FIG. 8]
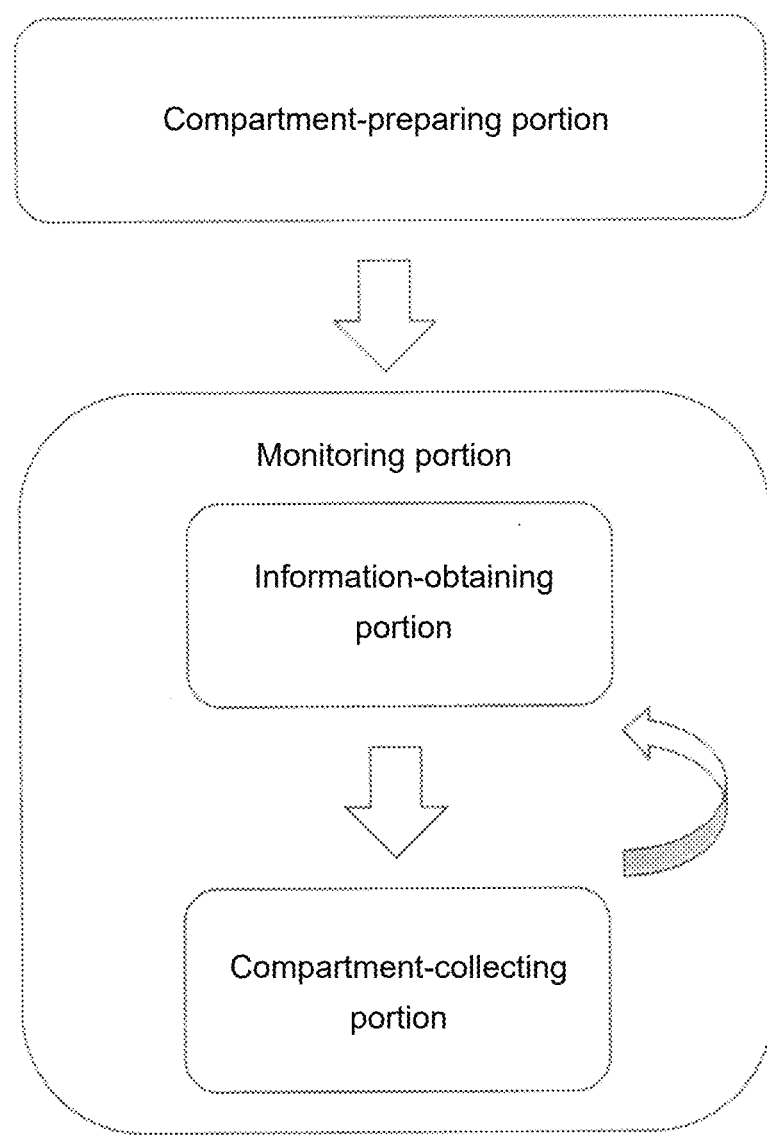

[FIG. 9]
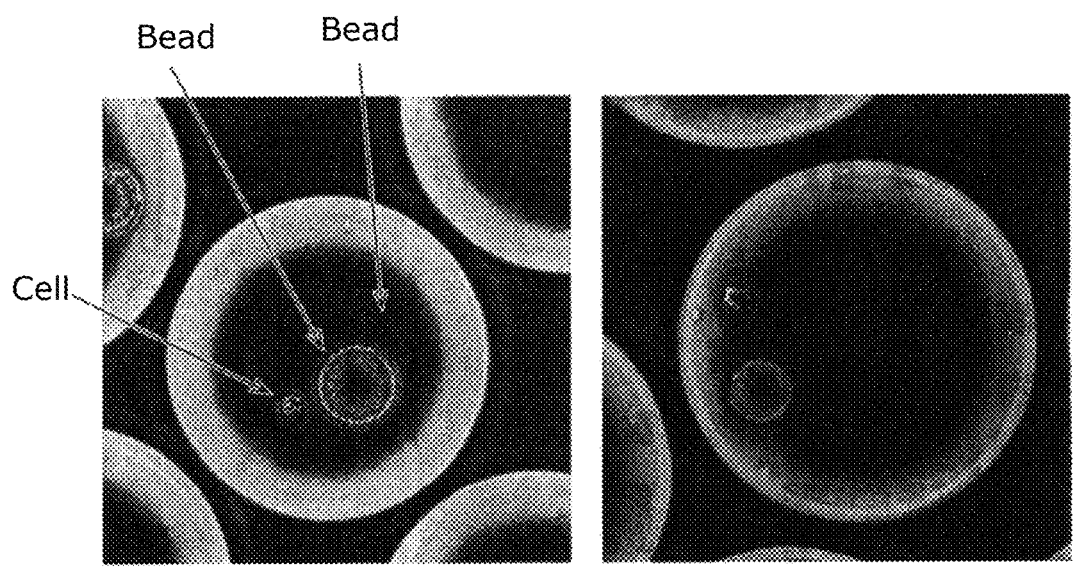
[FIG. 10]
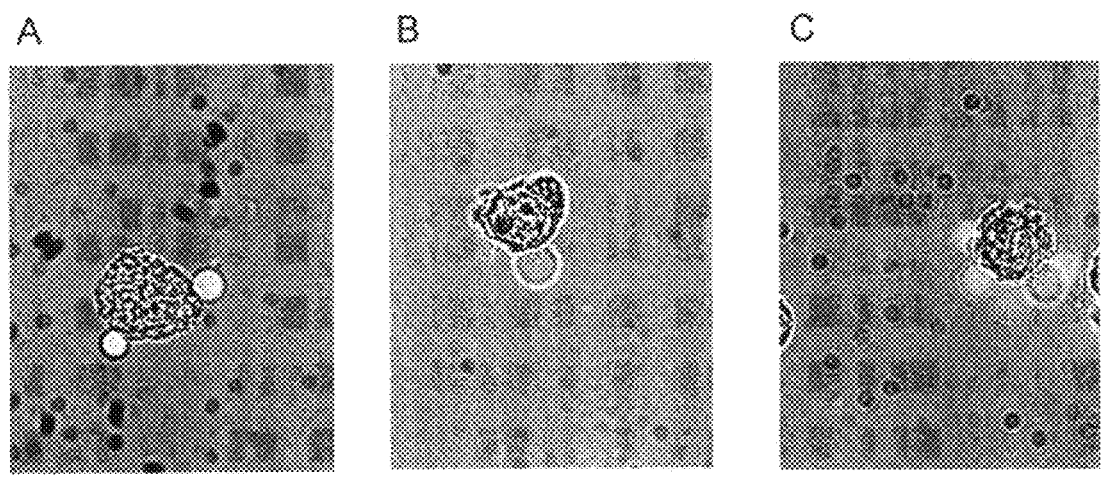

METHOD FOR MONITORING DYNAMIC CHANGES IN CELLS OR SUBSTANCE DERIVED THEREFROM, AND METHOD FOR CLASSIFYING CELL USING SAME

CROSS-REFERENCE TO RELATED APPLICATIONS

This application is the U.S. National Stage of PCT/JP2018/017565, filed May 2, 2018, which is based upon and claims the benefit of priority from Japanese Patent Application No. 2017-91964, filed on May 2, 2017; the entire contents of which are incorporated herein by reference.

BACKGROUND OF THE INVENTION

Field of the Invention

The present invention relates to a method for monitoring a dynamic change in a cell or a derivative thereof, and a method for classifying a cell using the same.

Background Art

A cell is a minimum unit constituting an organism. Heretofore, elucidation of the functions, structures, forms and the like of organisms had been attempted only for cell populations. However, recent studies have revealed that gene expression varies and is diverse depending on cells even in similar cell types such as cancer tissues, and there is a need for analyzing individual cells.

Meanwhile, as a method for performing one-cell (single cell) analysis, a cell state-measuring technique including flow cytometry has been conventionally used. For example, use of imaging techniques such as flow cytometry, microscopy, or imaging cytometry in which individual cells are dispersed into a fluid, the fluid is finely flowed, and individual cells are optically analyzed, enables obtaining morphological information of individual cells based on spatial information of the cells. Particularly, according to imaging flow cytometry, it is possible to perform a single cell analysis at a very high throughput (e.g., analysis of several tens of thousands of cells per second), and one-cell measurement of statistical numbers is possible (e.g., Non Patent Literature 1, etc.).

However, flow cytometry techniques including imaging flow cytometry has advantages in terms of measurement efficiency and accuracy, while a subject to be observed loses the order after one measurement, and thus one subject to be observed can only be measured once, and it was difficult to follow up the sequential dynamic change caused by the cells. Under such a technical situation, it can be said that a method for simple and effective monitoring of the dynamic change in a large amount of cells is still required.

CITATION LIST

Non Patent Literature

Patent Literature 1
Seibutsu-kogaku. Vol. 90, No. 12, 785-789 (2012)

SUMMARY OF THE INVENTION

An object of the present invention is to provide a method for simple and effective monitoring of a dynamic change in a cell or a derivative thereof.

Now, the present inventors have found that when at least one cell and at least one bead are enclosed into a compartment, and using imaging information of the bead as an index of identifying the cell, state measurement information of the cell in the compartment is repeatedly obtained over time, the dynamic change in the cell can be simply and effectively monitored. The present invention is based on the finding.

According to the present invention, the following (1) to (21) are provided:

(1) A method for monitoring a dynamic change in a cell, the method including:
preparing a plurality of compartments containing at least one cell and at least one bead, and
repeatedly obtaining over time both state measurement information of the cell or a derivative thereof in each compartment and imaging information of the bead to monitor a dynamic change in each cell or derivative thereof in the plurality of compartments,
wherein the imaging information of the bead in each compartment can be clearly distinguished from each other and becomes an index of identifying the cell or the derivative thereof contained in each compartment.

(2) The method according to (1), wherein the number of the beads per compartment is plural.

(3) The method according to (1) or (2), wherein the above dynamic change in a cell is at least one selected from a change in a form of a cell, a change in a cellular activity, and a change in a cell-to-cell interaction.

(4) The method according to any one of (1) to (3), wherein the measurement of state measurement information of the cell or the derivative thereof or imaging information of the bead is performed by flow cytometry or microscopy.

(5) The method according to any one of (1) to (4), wherein the imaging information of the bead is spatial information based on electromagnetic wave, fluorescence, phase, scattering, reflection, coherent Raman, Raman, or absorption spectrum.

(6) The method according to any one of (1) to (5), wherein the imaging information of the bead is at least one selected from the group consisting of spatial information of the bead, spatial arrangement information of the bead in each compartment, and spatial arrangement information of the bead and the cell in each compartment.

(7) The method according to any one of (1) to (6), wherein the compartment is in a form of a well, a droplet, or a gel particle.

(8) The method according to any one of (1) to (7), wherein the compartment includes a hydrogel.

(9) The method according to any one of (1) to (8), wherein the compartment is a cell carrying a bead or a subcompartment encompassing a bead.

(10) The method according to any one of (1) to (9), wherein the number of the cells per compartment is one.

(11) The method according to any one of (1) to (10), which includes separating each compartment after obtaining both state measurement information of the cell or the derivative thereof in each compartment and imaging information of the bead.

(12) The method according to any one of (1) to (11), wherein the plurality of compartments further includes a drug.

(13) A method for screening a drug, based on accumulated state measurement information of the cell or the derivative thereof obtained over time in the method according to (12).

(14) A method for classifying a cell or a derivative thereof, the method including obtaining a classification model of the cell or the derivative thereof, based on accumulated state measurement information of the cell or the derivative thereof obtained over time in the method according to any one of (1) to (12).

(15) The method for classifying a cell or a derivative thereof according to (14), the method including obtaining, apart from the above accumulated state measurement information, one-time point state measurement information of the cell or the derivative thereof at an optional time point, and obtaining a classification model of the cell or the derivative thereof, based on the one-time point state measurement information and the accumulated state measurement information.

(16) The method for classifying a cell or a derivative thereof according to (14) or (15), wherein the above accumulated state measurement information and the one-time point state measurement information are obtained by the same or another method.

(17) The method for classifying a cell or a derivative thereof according to any one of (13) to (16), the method including predicting a dynamic change or a feature of a test cell or a derivative thereof, based on the above cell classification model and state measurement information previously obtained of the test cell or the derivative thereof.

(18) The method for classifying a cell or a derivative thereof according to (17), wherein the above prediction includes a state prediction of a test cell or a derivative thereof at an optional time point.

(19) A system for monitoring a dynamic change in a cell or a derivative thereof, the system including:
a compartment-preparing portion which prepares a plurality of compartments containing at least one cell and at least one bead, and
a monitoring portion which repeatedly obtains over time both state measurement information of the cell or a derivative thereof in each compartment and imaging information of the bead to monitor a dynamic change in the cell or the derivative thereof, wherein the bead-related imaging information in each compartment can be clearly distinguished from each other and becomes an index of identifying the cell contained in each compartment.

(20) The system according to (19), wherein the above monitoring portion is provided with a compartment-collecting portion capable of collecting and separating the compartment over time.

(21) A compartment composition provided with at least one cell and at least one bead, which is used for the method according to any one of (1) to (18).

According to the present invention, it is possible to simply and effectively monitor a dynamic change in a cell or a derivative thereof, using imaging information of a bead in a compartment as an index of identifying the cell or the derivative thereof. In the present invention, since a cell and a bead are retained in a compartment and state measurement information of the cell or a derivative thereof is associated with imaging information of the bead, it is possible to effectively measure an individual sequential change in a large amount of cells even by using flow cytometry, in which cells, etc., are collected after measurement and lose the order. The method of the present invention can be particularly advantageously utilized in a rapid and effective analysis of a dynamic change in a single cell.

BRIEF DESCRIPTION OF THE DRAWINGS

FIG. 2 is a schematic diagram of an embodiment in which imaging information (optical ID) of n types of beads produced by controlling the size, RGB, fluorescent brightness, and other optical properties is used as an index.

FIG. 7A is a first schematic diagram of a method for analyzing, discriminating, or classifying a test cell newly obtained using a classification model obtained by machine learning using a classification result obtained based on one-time point state measurement information of a cell at an optional time point and accumulated state measurement information of the cell.

FIG. 7C is a third schematic diagram of a method for analyzing, discriminating, or classifying a test cell newly obtained using a classification model obtained by machine learning using a classification result obtained based on one-time point state measurement information of a cell at an optional time point and accumulated state measurement information of the cell.

FIG. 8 is a flow chart of a monitoring system of the present invention.

FIG. 9 is a photograph of a water-in-oil compartment containing a fluorescent bead and an NIH3T3 cell.

FIG. 10A is a composite photograph of a green fluorescent bead-carrying NIH3T3 cell taken by a fluorescence microscope and a bright field microscope. FIG. 10B is a composite photograph of a red fluorescent bead-carrying K562 cell taken by a fluorescence microscope and a bright field microscope. FIG. 10C is a composite photograph of a green fluorescent bead- and red fluorescent bead-carrying MIA-PaCa2 cell taken by a fluorescence microscope and a bright field microscope.

DETAILED DESCRIPTION OF THE INVENTION

Method for Monitoring a Dynamic Change in a Cell

A method for monitoring a dynamic change in a cell or a derivative thereof of the present invention is characterized by including preparing a plurality of compartments containing at least one cell or a derivative thereof and at least one bead, and repeatedly obtaining over time both state measurement information of the cell or the derivative thereof in each compartment and imaging information of the bead to monitor a dynamic change in each cell or derivative thereof in the plurality of compartments, wherein the imaging information of the bead in each compartment can be clearly distinguished from each other and becomes an index of identifying the cell in each compartment.

One preferred aspect of the monitoring method of the present invention will be described based on FIG. 1 and Tables 1 and 2, but the present invention is not particularly limited thereto.

Figure 1:
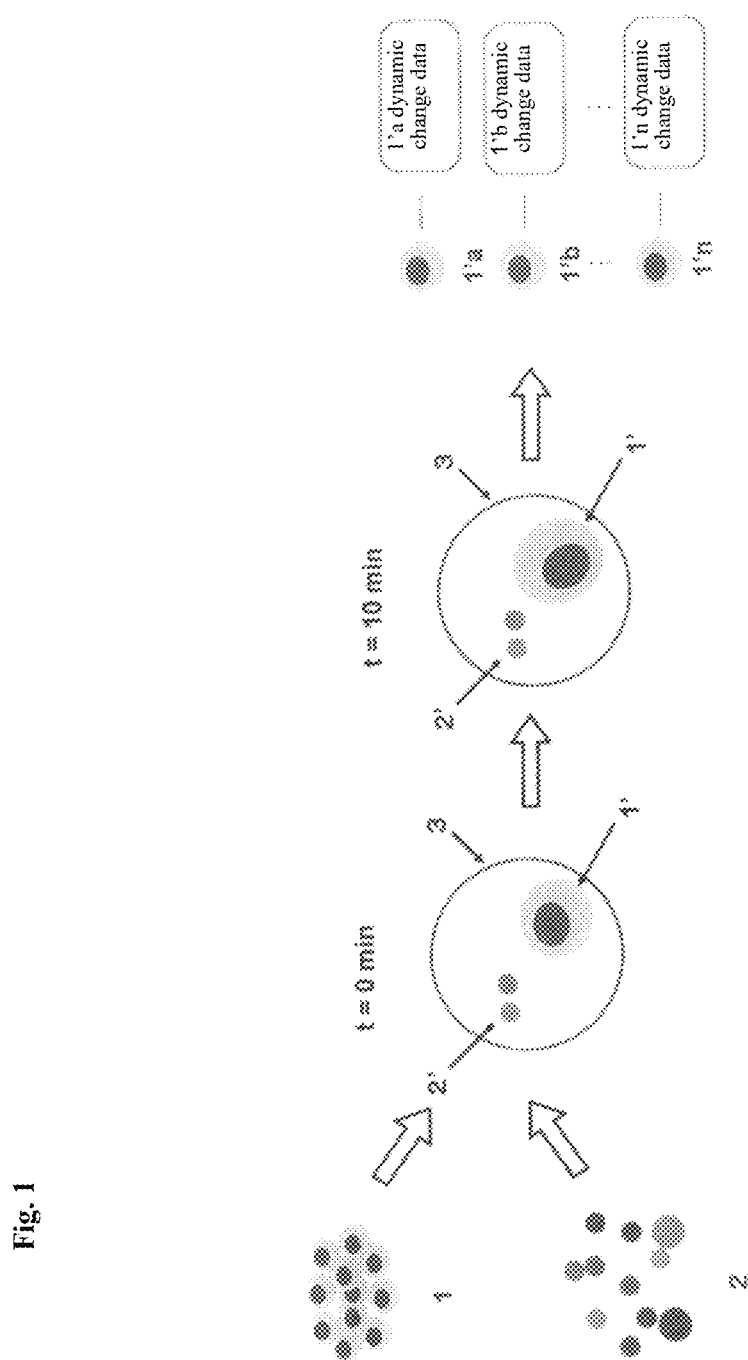
FIG. 1 is a schematic diagram showing a method for monitoring a dynamic change in a cell of the present invention.
Figure 3:
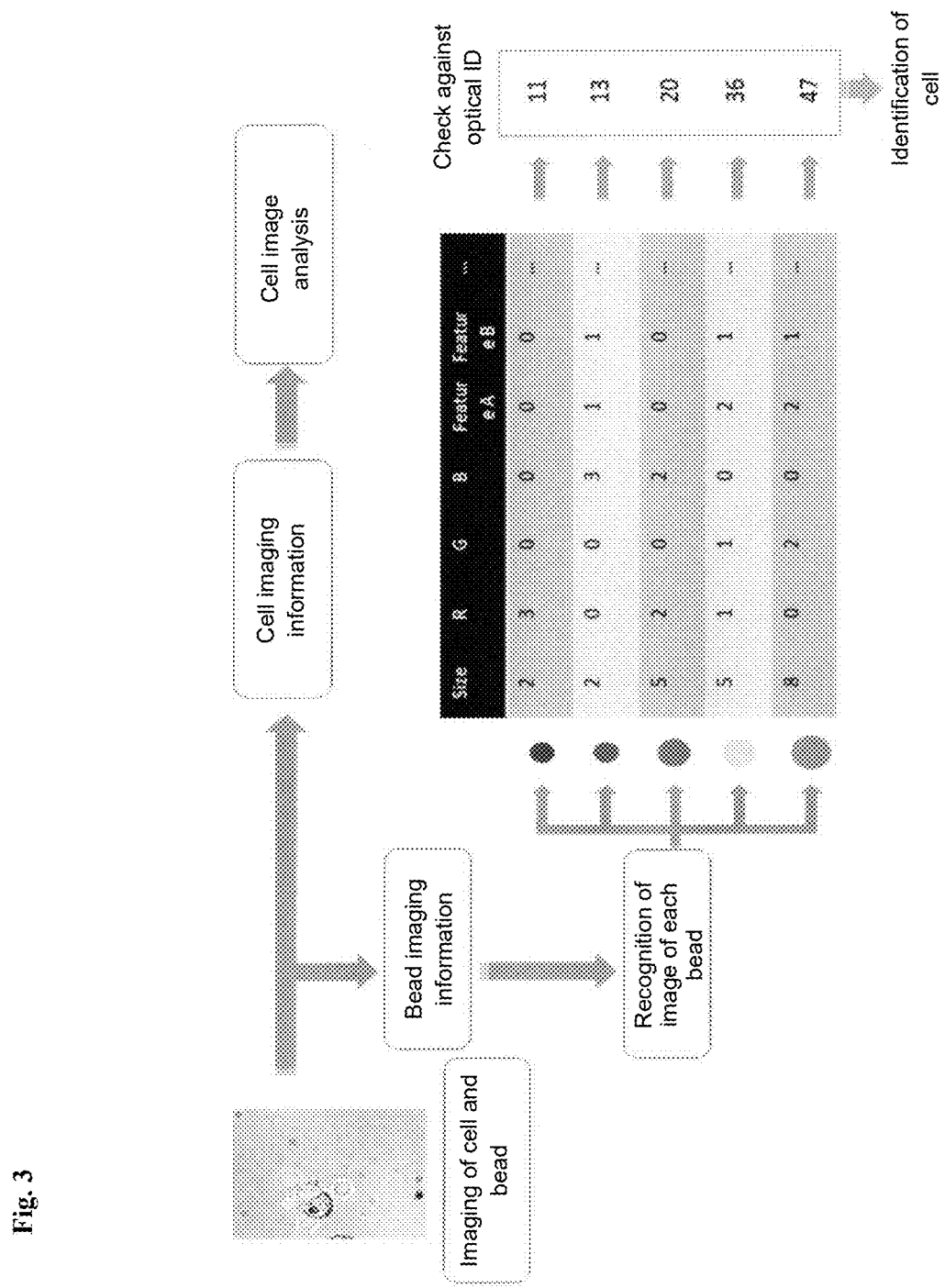
FIG. 3 is a schematic diagram of an embodiment in which a cell is identified using imaging information (optical ID) of a bead, and the status of each cell, etc., is analyzed from imaging information of the cell.

In the monitoring method of the present invention, as shown in FIGS. 1 to 3, a plurality of compartments 3 containing a cell 1' and a plurality of beads 2' are prepared by partitioning a cell group 1 and a bead group 2. Here, imaging information of the beads 2' can be clearly distinguished from each other.

When a plurality of different beads 2' are partitioned in combination, it is possible to produce various pieces of imaging information corresponding to the combination of beads for each compartment. For example, as shown in Table 1, when beads 2' are prepared based on a variation of color (3 types), color intensity (concentration; 6 types), and size (3 types), the types of the beads become a total of 645 types. Furthermore, when 645 types of a plurality of beads are partitioned to randomly enclose 3 beads per compartment, as shown in Table 2, a combination of different beads of more than $10^7$ patterns occurs stochastically. Such a combination of beads can be advantageously utilized in identifying various cells in a compartment by using imaging information of the beads as an index.

TABLE 1

| | Content | Number |
|---|---|---|
| Bead size (NBS) | 3, 7, 11 μm | 3 |
| Bead color (NBC) | Blue, Green, Red | 3 |
| Bead color intensity (NIL) | Dye concentration: 0, 1, 2, 3, 4, and 5 | 6 |
| Bead type (NBV) | $(NIL^{NBC} - 1)*NBS = (6^3 - 1)*3 = 645$ | 645 |

TABLE 2

| | Bead type | Number of combinations |
|---|---|---|
| Combination of 3 beads per compartment | 645 | $_{645}C_3 > 10^7$ |

Next, in the monitoring method of the present invention, both state measurement information of a cell 1' or a derivative thereof in each compartment 3 and imaging information of beads 2' are measured at the time of initiation of monitoring (t=0 min). Since the beads 2' or a combination thereof become(s) statistically unique for each compartment, state measurement information of the cell 1' or the derivative thereof in each compartment 3 can be associated with imaging information of the beads 2' in a one-to-one correspondence. Since such an association is realized by putting in a compartment, even when a plurality of compartments are mixed and lose the order after the state measurement of a cell and imaging information of beads are obtained, in the present invention, it is possible to identify the cell or the derivative thereof again using the imaging information of beads in each compartment as an index.

In FIG. 2 and FIG. 3, an analysis scheme of imaging information will be more specifically described.

FIG. 2 is a schematic diagram when imaging information of n types (ID) of beads produced by controlling the size, RGB, fluorescent brightness, and other optical properties is used as an index. In FIG. 2, imaging information of the bead is measured, and an optical bead ID is linked to the imaging information of the bead thus obtained. Furthermore, in FIG. 3, imaging of each compartment containing a cell and a bead is performed, and imaging information of the cell is associated with imaging information of the bead. When such an analysis method is adopted, it is possible to identifying the cell using optical bead ID information linked to imaging information of a bead, while imaging information of a cell enables analysis of the state of each cell, etc.

Next, in the monitoring method of the present invention, both state measurement information of a cell 1' or a derivative thereof in a compartment 3 and imaging information of a bead 2' are obtained again after a given time (e.g., t=10 min) elapsed. By repeating over time the obtaining of state measurement information of a cell or a derivative thereof and imaging information of a bead in this way, it is possible to accumulate state measurement information of each cell (1'a, 1'b, 1'c . . . 1'n) at each measurement time and to use this as data of a dynamic change in each cell (1'a, 1'b, 1'c . . . 1'n).

The type of the dynamic change in each cell or derivative thereof is not particularly limited as long as related state measurement information can be measured and accumulated over time. Suitable examples of the dynamic change in a cell include a change in a form of a cell, a change in an intracellular molecular structure, a change in a cellular activity, and a change in a cell-to-cell interaction and the like. As mentioned above, according to the present invention, a broad dynamic change in a cell or a derivative thereof can be effectively and correctively identified over time, and thus the method can also be advantageously utilized in classification of a cell and screening of a drug mentioned later.

The method of the present invention will be specifically described for each step.

Step of Preparing a Compartment

In the monitoring method of the present invention, as mentioned above, a plurality of compartments containing at least one cell or a derivative thereof and at least one bead are prepared.

Cell or a Derivative Thereof

The cell in the compartment of the present invention is preferably a cell group or a tissue-derived cell in terms of utilization for a single cell analysis that clearly distinguishes expression information between similar cells.

The number of cells is preferably one per compartment in terms of a single cell analysis. However, for example, when a dynamic change in a plurality of cells such as cell-to-cell interaction is measured, the number of cells per compartment may be plural, and such an aspect is also encompassed in the present invention.

The type and the form of a cell to be measured are not particularly limited as long as the effects of the present invention are not impaired, and a cell can be selected according to the object. Therefore, the cell of the present invention may be a floating cell or an adherent cell.

The subject to be measured may be a derivative of a cell. Examples of the derivative include a homogenate of a cell, a content of a cell, a secretion of a cell, a lysate of a cell, a cell cluster, a spheroid, an organoid and the like, and more specific examples thereof include a DNA, an RNA, a protein, a virus, and other cell-derived small molecules and the like. Making the cell derivative be the subject to be measured is particularly advantageous in obtaining molecular chemical evaluation information by liquid ELISA of a particular protein, reading of a particular DNA site, rtPCR of an RNA and the like, and in using the information for cell evaluation. The content and homogenate of a cell may be produced after the compartment is produced by enclosing d a cell into a compartment together with a cell lysis buffer, and such an aspect is also encompassed in the present invention.

Arrangement of a cell or a derivative thereof in a compartment is not particularly limited as long as obtaining of state measurement information of the cell or the derivative thereof and imaging information of a bead is not impaired, and a cell or a derivative thereof may be arranged in a compartment in a desired aspect according to the type, size, and nature of the cell or the derivative thereof. According to one aspect, the whole or part of a cell or a derivative thereof preferably exist in a compartment. According to another aspect of the present invention, a cell or a derivative thereof preferably exist on a compartment surface. Such an aspect can be particularly advantageously applied when the cell is an adherent cell.

In terms of using for flow cytometry, etc., a cell or a derivative thereof may be labeled with a fluorescent dye. As mentioned later, when the method of the present invention is utilized for screening of a drug, a desired drug may be added to a cell in advance, or a drug may be added to a compartment.

Bead

The bead of the present invention is used as an index of identifying the cell or the derivative thereof in each compartment based on imaging information thereof. Therefore, the bead of the present invention can be partitioned into a compartment together with a cell or a derivative thereof, and can be a particle whose imaging information can be measured. Since a bead partitioned into each compartment functions as an index of identifying the cell or the derivative thereof in the compartment, the bead preferably has imaging information that can be clearly distinguished from each other.

The imaging information of the bead may be unique imaging information of each bead itself, or may be imaging information from a combination of a plurality of beads.

Suitable imaging information of the bead is not particularly limited, and examples thereof include size, color, shape and the like. Here, "imaging" means a method which can separate and measure the measurement information of a test subject such as a bead, which temporally overlaps based on spatial information, and the measurement information of the test subject obtained by the imaging is referred to as "imaging information".

The size of the bead is not particularly limited, but it is preferably selected by considering the size of a bead to be enclosed into a desired compartment.

The color of the bead is not particularly limited, but as shown in Table 1, it can be appropriately selected by increasing or decreasing the concentration and type of a dye.

The shape of the bead may be any of various shapes such as a spherical shape, an almost spherical shape, an oval shape, a disc-like shape, a cube, and other three-dimensional shapes.

Suitable imaging information of the bead is regarded as at least one measurement information selected from color, fluorescence, size, shape, physical wave (e.g., sound, ultrasonic wave), electromagnetic wave (e.g., light, terahertz), transmission, phase, scattering, reflection, coherent Raman, infrared spectroscopy, Raman spectroscopy, and absorption spectrum. More specific examples thereof include fluorescence-encoding information (e.g., information imparted by organic fluorescent molecules, organism-derived fluorescent molecules, inorganic substances (quantum dots, heavy metals), or a combination thereof), absorption, Raman scattering-encoding information [e.g., information imparted by organic molecules having a different absorption wavelength range (molecule footprint), particularly alkyne-based compounds having a wavelength range that does not overlap a cell signal, inorganic substances or a combination thereof], phase, scattering, reflection-encoding information (e.g., information imparted by organic molecules having a different refractive index depending on the concentration, inorganic substances, or a combination thereof) and the like.

As the imaging information of the bead, spatial arrangement information of the bead alone or a combination thereof in a compartment can also be suitably utilized. The spatial arrangement also includes information on the relationship between the bead and a cell in each compartment (e.g., distance between the cell and the bead, etc.).

The material of the bead is not particularly limited as long as it can function as an index of identifying the cell, and the bead may be produced using various materials including resins and polymers. Examples of the material include a hydrogel, an inorganic substance (quantum dots, heavy metals), and specific examples thereof include a semiconductor such as a quantum dot (semiconductor nanoparticle) made of a semiconductor material such as cadmium selenide (CdSe), zinc sulfide (ZnS), cadmium sulfide (CdS), zinc selenide (ZnSe), or zinc oxide (ZnO); an inorganic substance such as a heavy metal such as gold; a hydrogel such as acrylamide, agarose, collagen, or alginic acid; or a resin such as polystyrene or polypropylene, and the material is preferably a hydrogel, and more preferably acrylamide.

The method for producing the bead of the present invention is not limited as long as the effects of the present invention are not impaired, and, for example, the bead can be produced according to a known method for producing a bead for flow cytometry measurement. In the above production method, if desired, in order to impart desired imaging information to each bead, the type or amount, etc., of a template used for production of the bead and a dye added may be adjusted.

Compartment

The compartment of the present invention contains at least one cell or a derivative thereof and at least one bead, and is a unit of compartment that can be distinguished from other compartments using imaging information of the bead in the compartment as an index.

The positional relationship between the cell and the bead in the compartment of the present invention is not particularly limited as long as obtaining of state measurement information of the cell and imaging information of the bead is not impaired, and it can be appropriately set according to the type, size, and nature of the cell and the bead. In the present invention, for example, the bead and the cell may coexist in a state in which the bead and the cell are or are not in contact with each other in the same compartment, and the bead may be introduced into the inside of the cell. Suitable examples of an aspect in which the bead and the cell are in contact with each other include an aspect in which the cell surface and the bead are directly adhered to each other or the bead is carried on the cell by using a commercially available cell membrane modifier, or the like. Suitable examples of an aspect in which the bead and the cell are not in contact with each other include an aspect in which the bead exists without being joined to the cell within the same compartment, or an aspect in which, by joining a subcompartment encompassing the bead but no cell to the cell, the subcompartment is carried on the cell, or the like. Suitable examples of an aspect in which the bead is introduced into the inside of the cell include an aspect in which the bead is ingested by the cell, or the like.

The form of the compartment or the subcompartment (compartment encompassing the bead but no cell) of the present invention is not particularly limited, and, for example, it can be a form of a well, a droplet, or a gel particle. More specific examples thereof include an aqueous droplet, an oil droplet, a gel particle of a hydrogel, a water-oil structure in which a plurality of non-mixed interfaces overlap such as an emulsion, a well such as a multiwell plate and the like.

As the base of the compartment or the subcompartment, it is preferable to use an aqueous base including a hydrogel (e.g., agarose, collagen, alginic acid, etc.) in terms of measurement of activity state of the cell.

The compartment or the subcompartment of the present invention preferably has a physical barrier function in the periphery thereof in terms of clear distinction from other compartments or subcompartments. A suitable method for producing a compartment or subcompartment having the barrier function includes a phase separation method and the like. In the phase separation method, for example, a cell and a bead are mixed with an aqueous base to obtain an aqueous droplet, and the aqueous droplet is suspended in a hydrophobic solvent, thus producing a compartment. The step of producing the compartment of the present invention will be more specifically described.

Figure 4:
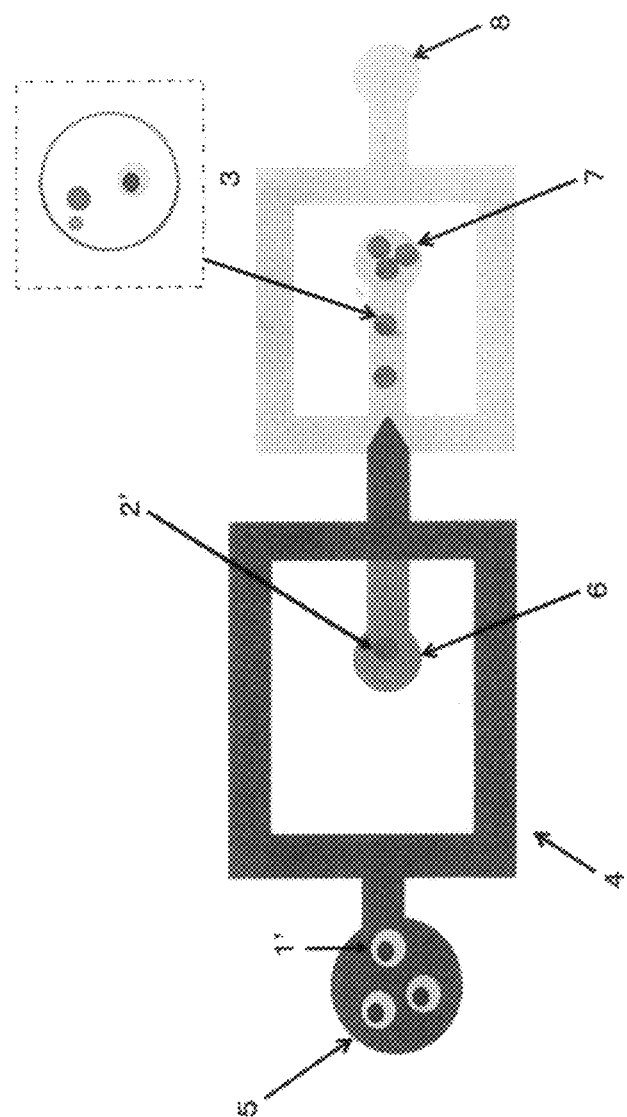
FIG. 4 is a schematic diagram showing one embodiment of a manufacturing process of a compartment.

FIG. 4 is a schematic diagram showing a suitable step of producing a compartment. In FIG. 4, a cell 1' exists as a sample solution together with a water-soluble base in a flow pass 5 of a flow-focusing device 4. In a flow pass 6, a bead 2'-containing solution, which is a mixture of a bead 2' and a water-soluble base exists. Then, the sample solution containing the cell 1' and the bead 2'-containing solution are mixed in the flow pass in the flow-focusing device 4, and are further released into a flow pass 7 filled with an oil 8, thus producing a compartment 3 containing the cell and the bead by phase separation. The number of cells and beads partitioned into one compartment can be simply adjusted by adjusting the solution sending speed in the flow-focusing device 4. The above method can also be utilized even when the cell is replaced by a derivative thereof (a homogenate, a secretion, etc.) or even when the cell is used in combination with a derivative thereof.

Obtaining of State Measurement Information of a Cell or a Derivative Thereof and Imaging Information of a Bead In the monitoring method of the present invention, using imaging information of a bead as an index of identifying a cell, by repeatedly obtaining over time both state measurement information of a cell or a derivative thereof in each compartment and imaging information of a bead, it is possible to effectively monitor a dynamic change in each cell or derivative thereof in a plurality of compartments.

The state measurement information of a cell or a derivative thereof of the present invention is not particularly limited as long as the feature or the state of the cell can be recognized, and examples thereof include imaging information of the cell or the derivative thereof, morphological information obtained from the cell or the derivative thereof and the like. More specifically, examples of the state measurement information of a cell or a derivative thereof of the present invention include imaging information based on measurement information such as color, fluorescence, size, shape, physical wave (e.g., sound, ultrasonic wave), electromagnetic wave (e.g., light, terahertz), transmission, phase, scattering, reflection, coherent Raman, infrared spectroscopy, Raman, or absorption spectrum, or morphological information of a cell such as nucleus, size of the cytoplasm, coarseness and fineness of the cytoskeleton, feature amount of the internal structure, uniformity of the membrane, fluorescence intensity of each structure, molecular localization, or positional relationship of the molecule or the subject to be observed, and preferably morphological information obtained from the cell. The state measurement information of a cell or a derivative thereof may be obtained by a known method, or when the state measurement information is imaging information, it may be obtained by the same method as for imaging information of a bead mentioned later.

In the present invention, a method for measuring imaging information of a bead is not particularly limited, and can be appropriately selected according to the nature of a cell to be measured or a derivative thereof and a bead. Suitable examples of the method for measuring imaging information of the present invention include fluorescence imaging, absorption imaging, absorption spectrum imaging, coherent Raman imaging (CARS method, SRS method), phase imaging, bright field imaging and the like.

More specific examples of the method for measuring imaging information include flow cytometry (e.g., an imaging flow cytometry method which observes a compartment flowing in a flow pass, etc.) and a microscopic measurement (a method for observing a compartment in a microwell using a general light microscope, etc.), and flow cytometry is preferable in terms of rapid measurement of a dynamic change in a single cell.

Figure 5:
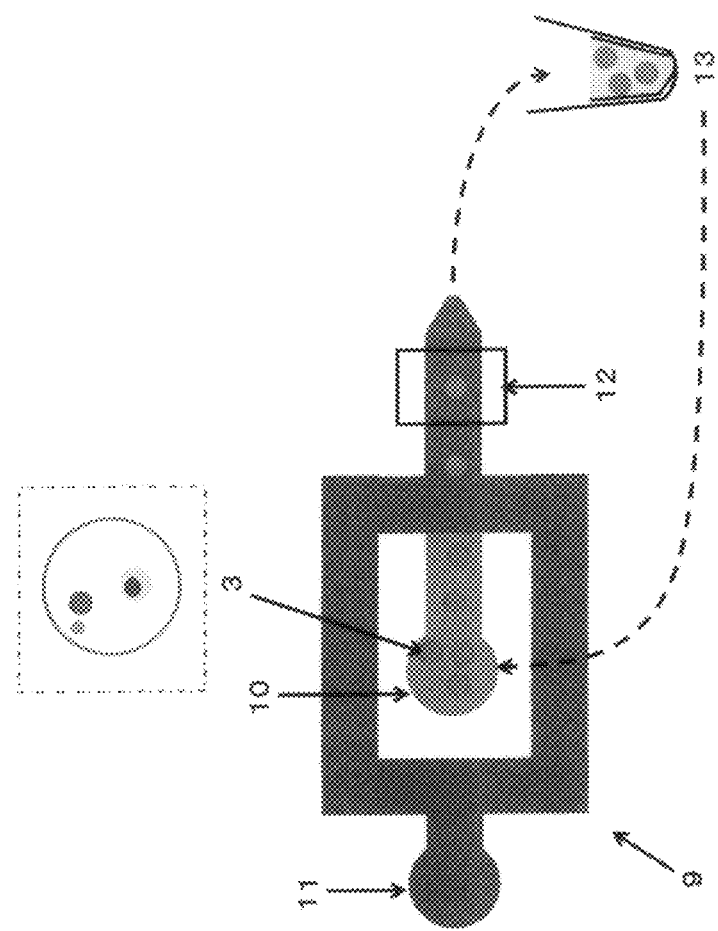
FIG. 5 is a schematic diagram of one embodiment in which a plurality of compartments are measured with a flow cytometer.

A specific aspect in which flow cytometry is used in the monitoring method of the present invention will be described based on FIG. 5. FIG. 5 is a schematic diagram of one embodiment in which a plurality of compartments are measured with a flow cytometer. In a flow cytometer 9 in FIG. 5, a compartment 3 is stored in a sample solution-accommodating portion 10, and mixed with a sheath solution 11 in a flow pass. With respect to a cell and a bead in the compartment 3 in the mixture, state measurement information of the cell and imaging information of the bead are measured and obtained at an information measurement position 12 in the flow pass, and the compartment 3 is separated into a container 13. In the container 13, a plurality of compartments 3 lose the measurement order and are randomly mixed. However, since the compartment 3 can be identified by imaging information of the bead, it is poured into the sample solution-accommodating portion 10 after a given time elapsed, and it became possible to obtain state measurement information of the cell and imaging information of the bead again.

Method for Classifying a Cell or a Derivative Thereof

Figure 6:
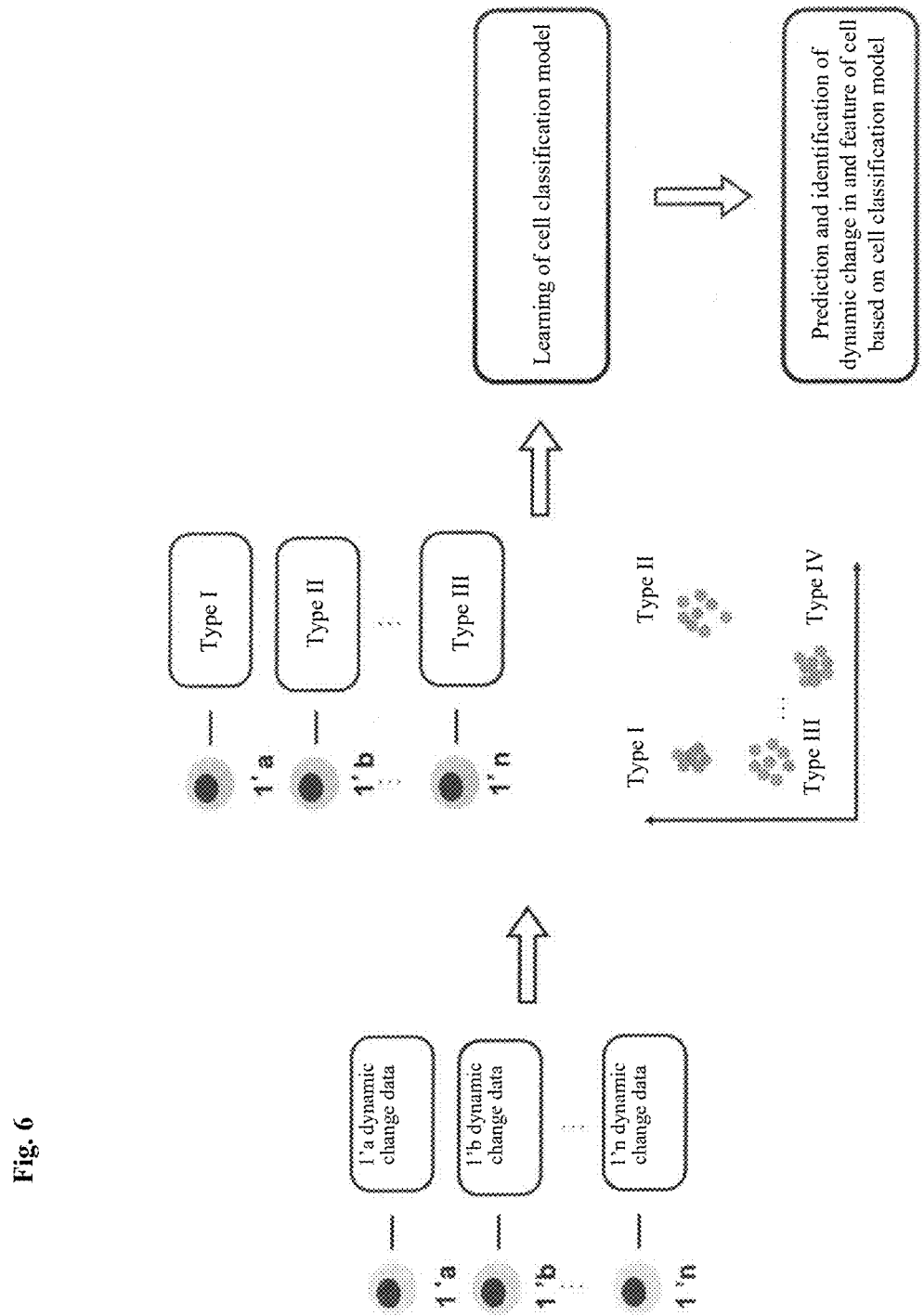
FIG. 6 is a schematic diagram of a method for producing a cell classification model based on accumulated measurement information of a cell obtained according to the present invention. The figure in the lower middle of FIG. 6 is a schematic diagram of a multidimensional classification model, which is expressed two-dimensionally, obtained by classifying dynamic change data of a cell on a multidimensional space.

In the monitoring method of the present invention, each cell or derivative thereof may be further classified based on the accumulated state measurement information of the cell or the derivative thereof obtained over time. For example, as shown in FIG. 6, data at one-time point or accumulated data on a dynamic change in a cell are input into a computer, and through machine learning and clustering on a multidimensional space, it is possible to label each cell with several types (type I, type II, type III . . . type IV) and classify. Therefore, according to another aspect, provided is a method for classifying a cell or a derivative thereof, which includes obtaining a classification model of the cell or the derivative thereof, based on accumulated state measurement information of the cell or the derivative thereof obtained over time in the method obtained by the monitoring method of the present invention. Furthermore, using the above classification model, it is possible to analyze, discriminate, or classify a test cell by referring to state measurement information of the test cell newly obtained.

Figure 7B:
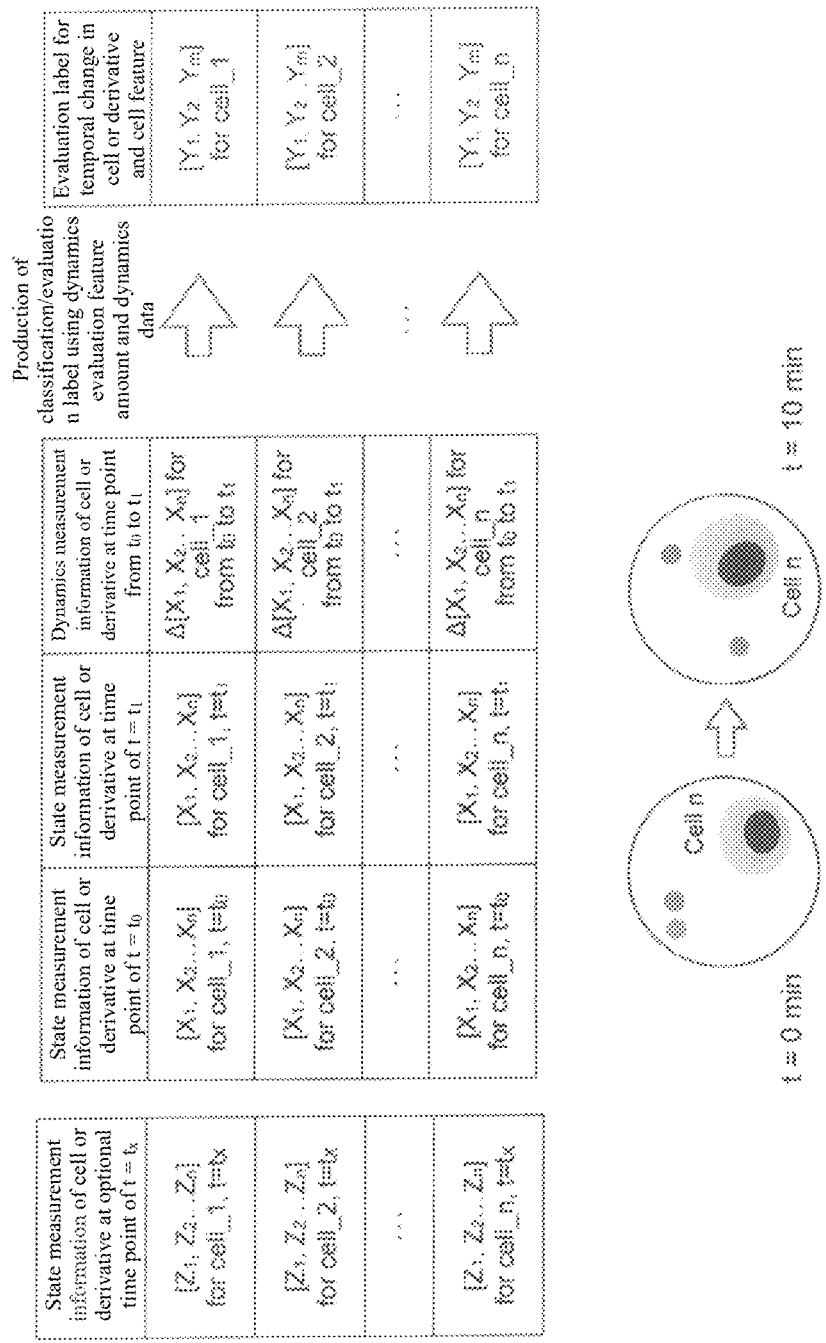
FIG. 7B is a second schematic diagram of a method for analyzing, discriminating, or classifying a test cell newly obtained using a classification model obtained by machine learning using a classification result obtained based on one-time point state measurement information of a cell at an optional time point and accumulated state measurement information of the cell.

In the method of the present invention, in analysis, discrimination, or classification of a test cell, apart from the above accumulated state measurement information, one-time point state measurement information of a cell or a derivative thereof at an optional time point may be further obtained and utilized. Such an aspect can be represented by schematic diagrams shown in FIGS. 7A to 7C. In FIGS. 7A to 7C, first, accumulated state measurement information $[X_1 \ldots X_n]$ of each cell or derivative thereof obtained at t=t0 to t1 (e.g., 10 minutes) and one-time point state measurement information $[Z_1 \ldots Z_n]$ of each cell or derivative thereof at an optional time point (t=tx) are prepared (FIG. 7A). Next, based on the accumulated state measurement information $[X_1 \ldots X_n]$, an evaluation label $[Y_1 \ldots Y_n]$ is produced (FIG. 7B). This evaluation label $[Y_1 \ldots Y_n]$ includes a dynamic change in a test cell or a feature of the cell associated therewith (type of the cell, activity of the cell, differentiation potential, molecule production ability, etc.). Next, the state measurement information $[Z_1 \ldots Z_n]$ of a cell or a derivative thereof at an optional time point tx is labeled with the above evaluation label $[Y_1 \ldots Y_n]$, and through machine learning using this as teaching data, it is possible to produce a classification model (FIG. 7C). Using the classification model of a cell or a derivative thereof obtained as mentioned above, by referring to state measurement information of a test cell newly obtained, it is possible to correctively and effectively predict and identify a dynamic change in the test cell or a feature of the cell associated therewith (type of the cell, activity of the cell, differentiation potential, molecule production ability, etc.). Therefore, according to a preferred aspect, the method of the present invention includes, using a classification model based on accumulated state measurement information of a cell or a derivative thereof, by referring to state measurement information previously obtained of a test cell or a derivative thereof, predicting a dynamic change in the test cell or the derivative thereof or a feature of the cell associated therewith.

According to the method of the present invention, the above method for classifying a cell or a derivative thereof can be advantageously utilized in screening of a cell having a desired activity. The method of the present invention is preferably utilized in production of antibody pharmaceuticals, cell preparations and the like. For example, in the production of antibody pharmaceuticals, by producing in advance a classification model which is produced by the method of the present invention and which is associated with morphological information of a cell, etc., it is possible to effectively obtain a cell strain that highly produces antibodies from a test cell. In the production of cell pharmaceuticals including pluripotent stem cells, based on a classification model which is produced by the method of the present invention and which is associated with morphological information of a cell, etc., it is possible to effectively obtain a cell having high proliferative capacity and differentiation potential. As mentioned above, by utilizing the method of the present invention for production of antibody pharmaceuticals and cell preparations, it becomes possible to greatly improve the production cost and the development efficiency thereof.

In the classification method of the present invention, a cell previously treated with a drug may be used as a subject to be measured. Such a cell which is obtained by screening and exhibits a desired activity is advantageously used as a subject which is cultured/proliferated and used for screening a drug having a desired activity.

Method for Screening a Drug

The classification method of the present invention can also be used for making a drug coexist with a cell or a derivative thereof in a compartment, measuring over time the effect of the drug on the cell or the derivative thereof, and selecting a drug exhibiting a desired activity on a particular cell. Therefore, according to a preferred aspect, provided is a method for screening a drug, based on accumulated state measurement information of a cell or a derivative thereof obtained over time in the method of the present invention. In the method, each compartment preferably contains a drug. The type and amount of a drug in each compartment can be appropriately set and changed by a person skilled in the art according to subjects of parameters of screening (type and amount of the drug), etc.

System/Compartment Composition

According to another aspect of the present invention, provided is a system for performing the method for monitoring a dynamic change in a cell or a derivative thereof of the present invention. The monitoring system includes a compartment-preparing portion which prepares a plurality of compartments containing at least one cell or a derivative thereof and at least one bead, and a monitoring portion which repeatedly obtains over time both state measurement information of the cell or the derivative thereof in each compartment and imaging information of the bead to monitor a dynamic change in the cell or the derivative thereof, wherein the imaging information of the bead in each compartment can be clearly distinguished from each other and becomes an index of identifying the cell or the derivative thereof contained in each compartment. Since the monitoring system of the present invention can integrally compose the compartment-preparing portion and the monitoring portion, the monitoring system is advantageous in effectively and simply performing the monitoring method of the present invention.

The monitoring system of the present invention integrally composed of the compartment-preparing portion and the monitoring portion will be specifically described based on the flow chart of FIG. 8.

In the system of the present invention, first, in the compartment-preparing portion, a plurality of compartments containing a cell or a derivative thereof and a bead are produced. As the compartment-preparing portion, it is possible to use, for example, the method mentioned in E. Z. Macosko et al., Highly Parallel Genome-wide Expression Profiling of Individual Cells Using Nanoliter Droplets. Cell. 161, 1202-1214 (2015), the flow-focusing device mentioned in Microfuid Nanofluid (2008) 5:585-594, Applied Physics Letters, Vol. 85, No. 13, 27, September 2004, p 2649-2651, JP 2013-508156 W and the like, and, for example, the flow-focusing device shown in the schematic diagram of FIG. 4 mentioned above and the like.

In the monitoring system of the present invention, measurement is performed by repeatedly obtaining both state measurement information of the cell or the derivative thereof and imaging information of the bead in the compartment produced in the compartment-preparing portion. Since the monitoring portion of the present invention repeatedly obtains state measurement information of a cell or a derivative thereof and imaging information of a bead, the monitoring portion is preferable to be provided with an information-obtaining portion that measures both information and a compartment-collecting portion (container, etc.) that collects a compartment obtained from the information-obtaining portion. The compartment collected in the compartment-collecting portion can be transported to the information-obtaining portion for measuring imaging information again.

As a device constituting the monitoring portion, a known measurement device or a combination thereof can be appropriately selected by a person skilled in the art according to desired information, and suitable examples thereof include the flow cytometer shown in FIG. 5, etc. In FIG. 5, the flow cytometer 9 functions as a monitoring portion, and the sample solution-accommodating portion 13 can function as a compartment-collecting portion.

Compartment Composition

The compartment of the present invention can be a form of an independent composition by appropriately selecting a base material and an interface structure. Therefore, according to another aspect of the present invention, provided is a compartment composition containing at least one cell and at least one bead for use in the method of the present invention.

Production and use of the system and the compartment composition of the present invention can be performed according to the description on the monitoring system of the present invention.

EXAMPLES

The present invention will be specifically described by way of Examples, but the present invention is not limited to these Examples. Unless otherwise specified, the measurement methods and the units of the present invention are in accordance with the provisions of the Japanese Industrial Standards (JIS).

Example 1: Preliminary Test for Producing a Compartment

A plurality of beads shown in Table 1 were produced based on the following method.

First, using a microfluidic chip, a droplet of a solution for gel production was produced. The dispersed phase of the solution composition was composed of 10 mM Tris-HCl [pH 7.6], 1 mM EDTA, 15 mM NaCl-containing 6.2% (v/v) acrylamide, 0.18% (v/v) bisacrylamide, 0.3% (w/v) ammonium persulfate, and fluorescence dyes with desired concentrations (blue: Alexa Fluor 405, green: calcein, red: Rhodamine). As a continuous phase, a fluorinated solution containing 0.4% (v/v) TEMED and a 0.5% (w/w) EA-surfactant was used. The above droplet was collected into a 1.5 ml tube together with 200 µL of mineral oil, and incubated at 65° C. for 12 hours to produce a bead by polymerization. The produced and solidified bead was washed twice with 20% (v/v) 1H,1H,2H,2H perfluorooctanol (B20156, Alfa Aesar) in 1 mL of HFE-7500 oil, washed twice with 1% (v/v) Span 80 (S6760, Sigma) in 1 mL of hexane (BDH1129-4LP, VWR), incubated for 0.5 to 1 minute between each step, and finally centrifuged at 5000 rcf for 30 seconds. After centrifugation, the hexane phase was suctioned, and the BHM pellet thus produced was dissolved in 1 ml of a TEBST buffer (10 mM Tris-HCl [pH 8.0], 137 mM NaCl, 2.7 mM KCl, 10 mM EDTA, and 0.1% (v/v) Triton X-100). Next, the bead was washed at 5000 rcf for 30 seconds using 1 mL of the TEBST buffer, and finally suspended again with 1 mL of the TEBST buffer to remove a trace amount of hexane. The bead thus obtained was stored at 4° C.

According to the method mentioned in Microfuid Nanofluid (2008) 5:585-594, Applied Physics Letters, Vol. 85, No. 13 or E. Z. Macosko et al., Highly Parallel Genome-wide Expression Profiling of Individual Cells Using Nanoliter Droplets. Cell. 161, 1202-1214 (2015), it is possible to produce a compartment enclosing the bead. Use of the flow cytometer shown in FIG. 5 enables clear distinction of each compartment using the above bead as an index. The above thing was confirmed by an imaging flow cytometer using a compartment enclosing the bead. The setting of the imaging flow cytometer was appropriately changed to that of a known device by the present inventors in accordance with the mention of the present description. Specifically, a known flow cytometer (ImageStream™) X Mark II Imaging Flow Cytometer, etc.) can be used by changing the design according to the mention related to FIG. 5 of the present description.

Example 2: Production of a Compartment

Production of Fluorescent Beads

First, a fluorescently labeled alginic acid solution was produced. Specifically, a fluorescent dye with a desired concentration was added to a 2% (w/w) sodium alginate solution to produce a green, red, or blue fluorescent sodium alginate solution. 5FTSC (fluorescein-5-thiosemicarbazide) was used as the green fluorescent dye, AF555 Hydrazide was used as the red fluorescent dye, and Cascade Blue Hydrazide was used as the blue fluorescent dye.

A dispersed phase solution obtained by mixing a fluorescent sodium alginate solution with a Ca-EDTA solution (50 mM-EDTA/50 mM sodium chloride, pH7.2) in equal parts was obtained. Next, the dispersed phase solution was added to a continuous phase solution (a fluorine oil containing a surfactant), and droplets were formed in the mixture thus obtained. Then, acetic acid was added to the mixture so that the concentration became 0.05% to release Ca from Ca-EDTA, and the droplets were gelated to produce fluorescent alginic acid beads. The fluorescent beads in the mixture were isolated by washing with 1H,1H,2H,2H-perfluorooctanol.

In accordance with the above procedure, a green, red, or blue fluorescent beads were obtained. The fact that establishing a plurality of sizes and types of fluorescence intensity (brightness) for each fluorescent bead by adjusting the amount of the reagent can be performed by a person skilled in the art as needed will be obvious for a person skilled in the art.

Confirmation of Fluorescence Stability

To 5 mL of a TEBST buffer (10 mM Tris-HCl [pH 8.0], 137 mM NaCl, 2.7 mM KCl, and 0.1% (v/v) Triton X-100), about 10,000,000 beads (green, red, and blue fluorescent first beads) were added to suspend. At time points of 0 hour and 72 hours after addition of the buffer, the brightness of the beads was confirmed by flow cytometry. As a result, no change in the fluorescence spectrum was observed at time points of 0 hour and 72 hours.

According to the method mentioned in E. Z. Macosko et al., Highly Parallel Genome-wide Expression Profiling of Individual Cells Using Nanoliter Droplets. Cell. 161, 1202-1214 (2015), a compartment containing the above fluorescent bead and a cell was produced by a droplet production method using microfluidic techniques. A photograph of the compartment thus obtained is shown in FIG. 9.

Example 3

Preparation of a Compartment Composed of a Fluorescent Bead-Carrying Cell
(a) Green Fluorescent Bead-Carrying NIH3T3 Cell A solution containing NIH3T3 removed from a culture plate and a BAM reagent (cell membrane modifier) was centrifuged to obtain a green fluorescent bead-carrying NIH3T3 cell as a compartment. A composite photograph of the obtained green fluorescent bead-carrying NIH3T3 cell taken by a fluorescence microscope and a bright field microscope is shown in FIG. 10A.
(b) Red Fluorescent Bead-Carrying K562 Cell By the same method as in (a) except that the cell was a K562 cell and the bead was the red fluorescent bead in place of the green fluorescent bead, a red fluorescent bead-carrying K562 cell was obtained. A composite photograph of the obtained red fluorescent bead-carrying K562 cell taken by a fluorescence microscope and a bright field microscope is shown in FIG. 10B.
(c) Green Fluorescent Bead- and Red Fluorescent Bead-Carrying MIA-PaCa2 Cell By the same method as in (a) except that the cell was a MIA-PaCa2 cell, the bead was the green fluorescent bead and the red fluorescent bead, a green fluorescent bead- and red fluorescent bead-carrying MIA-PaCa2 cell was obtained. A composite photograph of the obtained green fluorescent bead- and red fluorescent bead-carrying MIA-PaCa2 cell taken by a fluorescence microscope and a bright field microscope is shown in FIG. 10C.

Example 4

For each compartment composed of the fluorescent bead-carrying cells obtained in Examples 3(a), 3(b), and 3(c), both state (form) measurement information of the cell and imaging information of the bead were repeatedly obtained over time. As the flow cytometer, a device after changing the design of a known flow cytometer in accordance with the description of Scientific Reports volume 4, Article number: 7253 (2014). From the obtained image information of the compartment, each of cell image information and bead image information was obtained. Then, after a dynamic change in the cell was monitored from the cell image information, it was confirmed that the cell can be identified from the bead image information.

REFERENCE SIGNS LIST

1 Cell group
1' Cell
2 Bead group
2' A plurality of beads
3 Compartment
4 Flow-focusing device
5,6,7 Flow pass
8 Oil
9 Flow cytometer
10 Sample solution-accommodating portion 10
11 Sheath solution
12 Information measurement position
13 Container

The invention claimed is:

1. A method for monitoring a dynamic change in a cell or a derivative thereof, the method comprising:
preparing a plurality of compartments, wherein each of the compartments contains at least one cell or a derivative thereof and a combination of a plurality of beads, and
repeatedly obtaining over time both state measurement information of the cell or the derivative thereof and imaging information of the combination of the plurality of beads in each compartment by flow cytometry to monitor a dynamic change in each cell or derivative thereof in the plurality of compartments by using the imaging information of the combination of the plurality of beads as an index of identifying the cell or the derivative thereof in each compartment,
wherein the imaging information of the combination of the plurality of beads in each compartment can be clearly distinguished from each other, and
wherein, during repeatedly obtaining over time both state measurement information of the cell or the derivative thereof and imaging information of the combination of the plurality of beads in each compartment by flow cytometry, the plurality of compartments lose a measurement order and are randomly mixed.

2. The method according to claim 1, wherein the dynamic change in a cell or a derivative thereof is at least one selected from the group consisting of a change in a form of a cell or a derivative thereof, a change in an intracellular molecular structure, a change in a cellular activity, and a change in a cell-to-cell interaction.

3. The method according to claim 1, wherein the imaging information of the combination of the plurality of beads is information based on electromagnetic wave, fluorescence, phase, transmission, spectroscopy, multicolor, scattering, reflection, coherent Raman, Raman, or absorption spectrum.

4. The method according to claim 1, wherein the imaging information of the combination of the plurality of beads is at least one selected from the group consisting of spatial information of the combination of the plurality of beads, spatial arrangement information of the combination of the plurality of beads in each compartment, and spatial arrangement information of the combination of the plurality of beads and the cell in each compartment.

5. The method according to claim 1, wherein the compartment is in a form of a droplet or a gel particle.

6. The method according to claim 1, wherein the compartment comprises a hydrogel.

7. The method according to claim 1, wherein the compartment is a cell carrying the combination of the plurality beads or a subcompartment encompassing the combination of the plurality of beads.

8. The method according to claim 1, wherein the number of the cells per compartment is one.

9. The method according to claim 1, which comprises separating each compartment after obtaining both state measurement information of the cell or the derivative thereof in each compartment and imaging information of the combination of the plurality of beads.

10. The method according to claim 1, wherein the plurality of compartments further comprises a drug.

\* \* \* \* \*